(12) United States Patent
Peter et al.

(10) Patent No.: US 7,523,983 B2
(45) Date of Patent: Apr. 28, 2009

(54) SAFETY BRAKING DEVICE OF A SLIDING ROOF COVER

(75) Inventors: Roland Peter, Darmstadt (DE); Morton Ketelsen, Münster (DE)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 11/845,800

(22) Filed: Aug. 28, 2007

(65) Prior Publication Data

US 2008/0073944 A1 Mar. 27, 2008

(30) Foreign Application Priority Data

Sep. 27, 2006 (EP) .................................. 06020258

(51) Int. Cl.
*B60J 7/185* (2006.01)
(52) U.S. Cl. ..................................... 296/223
(58) Field of Classification Search .................. 296/223
See application file for complete search history.

(56) References Cited

U.S. PATENT DOCUMENTS 4,363,515 A * 12/1982 Lutz et al. .................... 296/222
5,167,296 A * 12/1992 Schreier et al. ............. 180/281
6,224,147 B1 * 5/2001 Farber et al. ........... 296/216.04
6,382,714 B1 * 5/2002 Adam et al. ................. 296/223
2004/0068839 A1 * 4/2004 Hock et al. .................... 16/215

FOREIGN PATENT DOCUMENTS

DE 10325327 B3 3/2005
DE 102004003911 A1 8/2005
EP 1044837 A2 10/2000

OTHER PUBLICATIONS

Machine translation of EP1044837 via esp@cenet, 5 pages description, 2 pages claims.*
European Search Report Dated Mar. 16, 2007.

* cited by examiner

*Primary Examiner*—Dennis H Pedder
(74) *Attorney, Agent, or Firm*—Carlson, Gaskey & Olds PC

(57) ABSTRACT

A safety braking device for a sliding roof cover that is moved in translation along vehicle-fixed guides includes at least one braking element that is coupled with the sliding roof cover, and which in normal operation moves together with the sliding roof cover in translation along an associated guide. A coupling piece is movable with the sliding roof cover and makes a connection between the sliding roof cover and the braking element. The coupling piece extends into the braking element. The coupling piece displaces in the braking element upon an abrupt acceleration of the sliding roof cover relative to the guide, and deforms the braking element such that the braking element and the associated guide are jammed to prohibit further movement of the sliding roof cover along the associated guide.

15 Claims, 3 Drawing Sheets

SAFETY BRAKING DEVICE OF A SLIDING ROOF COVER

RELATED APPLICATIONS

The application claims priority to European Application No. 06 020 258.7, which was filed on Sep. 27, 2006.

BACKGROUND OF THE INVENTION

The invention relates to a safety braking device of a sliding roof cover that can be moved in translation along vehicle-fixed guides, and which includes at least one braking element coupled with the sliding roof cover, and which in normal operation can be moved together with the sliding roof cover in translation along an associated guide.

Safety braking devices of this type are supposed to prevent a deployed, or at least partially opened, cover from experiencing a large displacement relative to the vehicle during an accident. These safety braking devices have to have a very short response time and must provide, above all, a fail-proof reliability in terms of activation.

A generic safety braking device is known from DE 103 25 327 B3, in which a predetermined breaking point is provided in a drive train between a power unit and the sliding roof cover. The predetermined breaking point is sheared off in response to a high acceleration value, which disrupts a connection between the sliding roof cover and the power unit to release the sliding roof cover and engage the sliding roof cover with the braking device.

The invention provides an improved braking device which is more easily adapted to a desired trigger force than that which is known in the prior art.

SUMMARY OF THE INVENTION

A safety braking device includes a coupling piece that can be moved with a cover, and which makes a connection between the cover and a braking element. The coupling piece extends into the braking element and displaces in the braking element upon an abrupt acceleration of the cover relative to a guide, and deforms the braking element such that the braking element and the guide are jammed. In one example, the braking element does not break into two pieces. Instead, the braking element is plastically or elastically deformed outwards in such a manner by the coupling piece extending into the braking element that the braking element and the guide will get jammed or locked together.

Locking may not imperatively result in an exclusively frictional locking. It is also possible that the guide has depressions in which a deformed part of the braking element extends, so that an interlocking fit could result during braking or blocking.

In one example, the coupling piece is directly attached to a drive mechanism of the cover. The drive mechanism could comprise a drive cable, for example.

In one example, the braking element directly or indirectly locks the drive mechanism in a guide for the drive mechanism (such as a cable guide, for example) so that a connection between the coupling piece and the drive mechanism is not subjected to excessive loads when the braking device is activated. In this arrangement, it is possible to make the braking element protrude as far as to the drive mechanism. Alternatively, the braking element could displace the coupling piece, so that the coupling piece locks the drive mechanism in the guide for the drive mechanism.

In another aspect, the braking element may provide a double function where the braking element provides braking as well as comprising a sliding carriage for governing movement of the cover. Such sliding carriages, or sliding elements, glide in guide rails and govern raising movement of the cover, in particular by using levers and/or guide slots, for example.

In one embodiment, the coupling piece has an entraining portion that laterally extends into the braking element. Such entraining portion provides for deformation of the braking element.

To achieve deformation, the braking element, in a vehicle longitudinal direction in front of and/or behind the entraining portion, has at least one protrusion that extends into a horizontal travel path of the entraining portion. This means that nothing else other than the protrusion obstructs the movement of the coupling piece due to inertia forces generated during a vehicle collision. Thus, the entraining portion bears against the protrusion and deforms the protrusion and, hence, an outer wall of the braking element in an outward direction.

In one example, locking is achieved when the braking element has two opposite protrusions, such as one upper and one lower protrusion, located in front of and/or behind the entraining portion of the coupling piece that extends into the braking element. In this example, the braking element will be deformed in two opposite directions. As an alternative, the coupling piece may extend into the braking element in such a manner that a locking occurs in a horizontal direction transverse to a vehicle longitudinal axis.

If the protrusion directly adjoins the entraining portion, relative movement between the braking element and the coupling piece will be very small. Further, rattling noises during normal driving operation will be prevented.

In one embodiment, the braking element includes a recess comprising an elongated hole, for instance, which is constricted by the at least one protrusion in front of at least one axial end of the elongated hole in a direction of travel. The elongated hole widens again behind this protrusion.

In one example, the height of the recess in the braking element is equal to an overall height of the entraining portion of the coupling piece extending into the recess. Any rattling noises will be prevented by this measure, too. Moreover, a good alignment is ensured between the braking element and coupling piece.

In order to enhance the locking effect, the coupling piece may have a braking rib at an outer side facing the guide. In one example, this braking rib is situated in a region of the protrusion.

To facilitate production, the braking element is made of plastic, for example. With this design it is possible, even without any additional parts, to generate return forces which are required, for instance after full braking, for restoring an initial position of the coupling piece relative to the braking element. This could occur because a certain locking effect may or should already be provided during full braking.

These and other features of the present invention can be best understood from the following specification and drawings, the following of which is a brief description.

DETAILED DESCRIPTION OF THE PREFERRED EMBODIMENT

Figure 1:
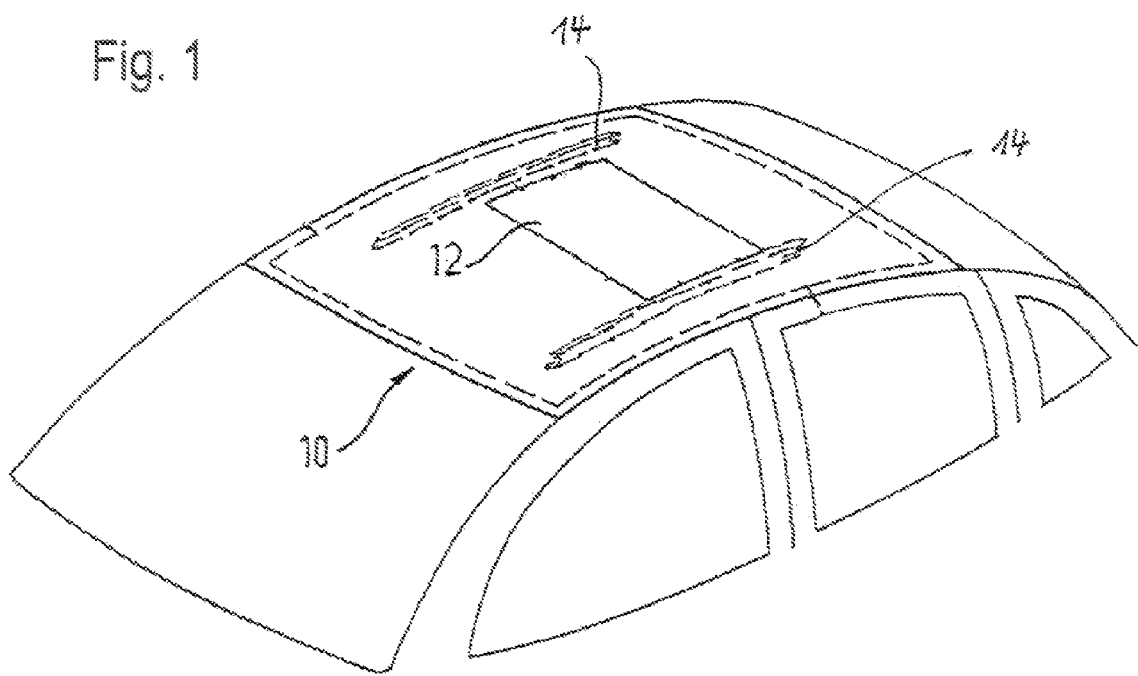
FIG. 1 is a top view of a vehicular sliding roof including a cover which is safeguarded through a safety braking device according to the invention.

FIG. 1 illustrates a vehicle roof 10, in particular a roof module, which is provided with a movable cover 12. The movable cover 12 is able to expose and close a roof opening situated underneath the cover 12, and has a size corresponding to the latter.

The vehicle roof 10 may be a sliding/raising roof in which the cover 12 is selectively raised at a rear edge and shifted to lie under a stationary roof sheet provided behind the cover 12, or e.g. a spoiler roof in which the cover 12 can be raised and moved to lie above the stationary roof sheet.

The cover 12 is guided in lateral guides 14, as known in the prior art. To this end, sliding carriages 16 are provided that are guided in the cover 12, and which are directly or indirectly coupled to the cover 12. The sliding carriages 16, through levers or slotted guides, govern movement of the cover 12 in vertical and horizontal directions.

Figure 2:
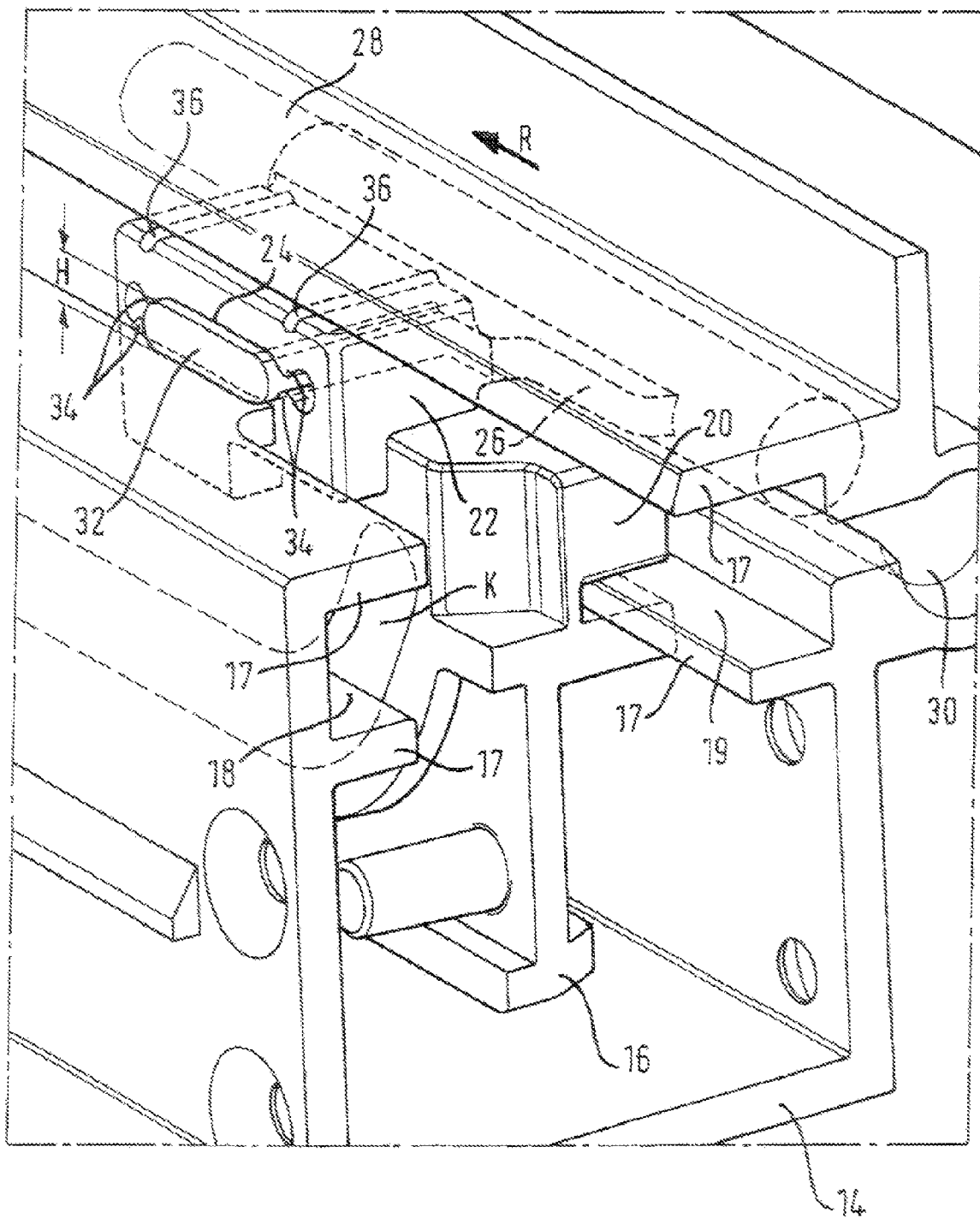
FIG. 2 is a perspective sectional view through a guide of the cover in a region of the safety braking device according to the invention.

FIG. 2 illustrates a U-shaped lateral guide 14 with two legs. Running in this lateral guide 14 is the sliding carriage 16 which is made of plastic material. In one example, the sliding carriage 16 is exclusively made of plastic material. This sliding carriage 16 is elongated and has a guide slot K through which raising movement of the cover 12 at a cover rear edge is governed.

At upper ends of the two legs, the lateral guide 14 has an F-shaped form, so that a left-hand guide 18 and a right-hand guide 19 are formed by two rails 17. Each rail 17 is engaged by a tongue 20 of the sliding carriage 16. For the left-hand guide 18, the respective tongue 20 cannot be seen.

In a region of an upper end, the sliding carriage 16 has a formed-on top piece which is referred to as braking element 22. The braking element 22 may be made in one piece with the sliding carriage 16, i.e. from a section thereof, or the sliding carriage 16 may be configured in several parts, with one part forming the braking element 22.

The braking element 22 likewise extends at least in part between the rails 17 of the right-hand guide 19.

An elongated hole 24 provided in the braking element 22 and extending rectilinearly in a horizontal direction serves to receive a coupling piece 26. The coupling piece 26 is directly connected with a drive mechanism 28 in the form of a cable that is guided in the lateral guide 14 in a corresponding cable guide 30 to be resistant to buckling. This drive mechanism 28 is driven by an electric motor (not shown) and moves all sliding carriages 16 which are responsible for governing the movement of the cover 12.

The coupling piece 26, in particular, is made of plastic and is directly fastened to the drive mechanism 28 by injection-molding, for example. A construction in metal is also possible. Laterally protruding from the coupling piece 26 is an entraining portion 32 that has a height H and shape adapted to a height H of the elongated hole 24. In the example shown, the entraining portion 32 extends into the elongated hole 24 and almost completely fills the elongated hole 24. In a direction of travel R in front of and behind the entraining portion 32, the elongated hole 24 is constricted by vertical protrusions 34, which have a rounded or trapezoidal cross-section and are integrally formed on the braking element 22. The vertical protrusions 34 extend into the elongated hole 24 from the top and the bottom and, hence, into a displacement path of the entraining portion 32. These vertical protrusions 34, however, are spaced from axial ends of the elongated hole 24 in the direction of travel R, so that each elongated hole 24, between the vertical protrusions 34 and the respective axial end, again widens to its original height. The entraining portion 32 has axially rounded ends, which may also have a wedge-shaped profile, however.

The arrangement of FIG. 2 comprising the guide 14, the sliding carriage 16, the braking element 22, and the coupling piece 26 forms a safety braking device for the cover 12. This braking device locks the cover 12 in position relative to the lateral guide 14 during an accident.

Figure 3A:
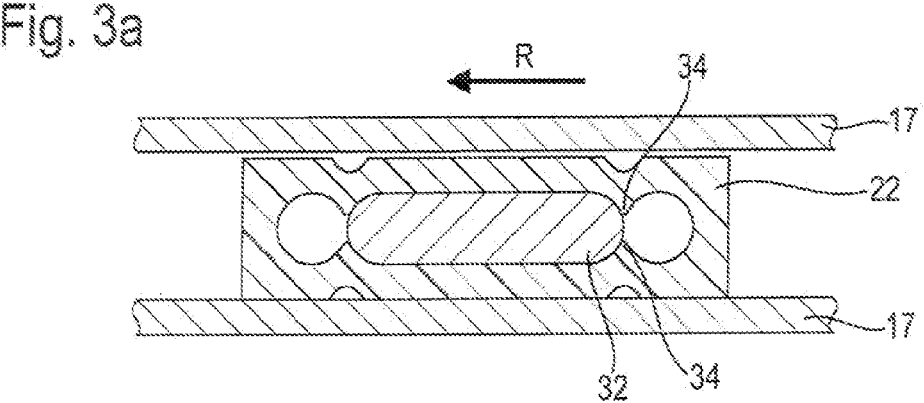
FIG. 3a is a sectional view of the safety braking device of FIG. 2 in a non-actuated state.

In a non-activated state of the braking device (FIGS. 2 and 3a), during normal driving operations and also during raising and shifting motions of the cover 12, the vertical protrusions 34 rest at the entraining portion 32.

Figure 3B:
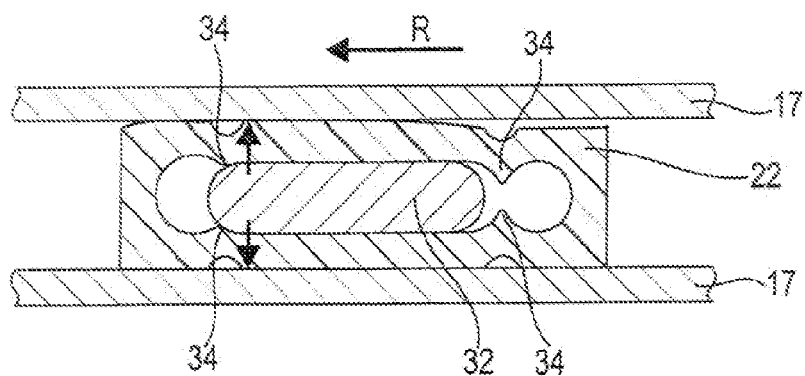
FIG. 3b is a sectional view of the safety braking device of FIG. 2 in an actuated state.

In case of an accident (in particular a frontal impact or rear-end impact), or, even during full braking, with the drive mechanism 28 and the sliding carriage 16 being both stationary, the large inertia mass of the cover 12 will induce a relative movement between these parts. In this process, the cover 12 entrains the drive mechanism 28 and the drive mechanism 28 entrains the coupling piece 26. The entrainment portion 32 strikes against the protrusions 34 at the respective side and moves between them (FIG. 3b). Thereby the braking element 22 is deformed in a vertical direction and bends outward to the top and bottom. In one example, the braking element 22 is plastically deformed. Thus, the braking element 22 gets jammed in the right-hand guide 19, so that no further movement of the sliding carriage 16 and, hence, of the cover 12 is possible.

To improve the locking effect, the braking element 22 includes braking ribs 36 in a region of the vertical protrusions 34 that protrude upwards.

In one example embodiment, braking devices are provided on the two lateral guides 14.

Figure 4:
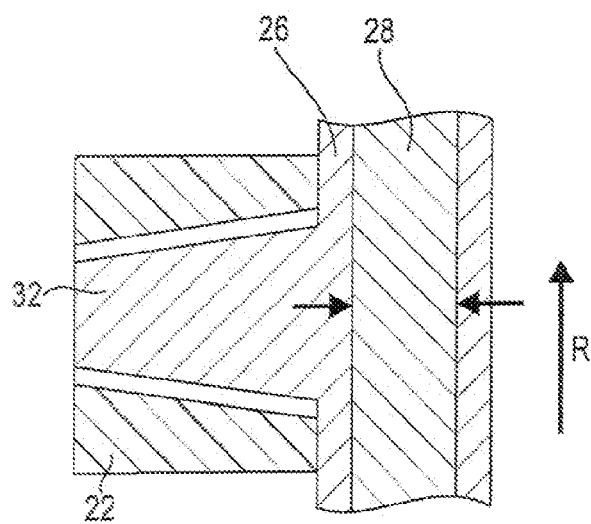
FIG. 4 is a sectional view of the safety braking device of FIG. 2 illustrating a functional principle of locking a drive mechanism in a guide for the drive mechanism.

If loading between the drive mechanism 28 and the coupling piece 26 is excessive during blocking of the braking element 22, the drive mechanism 28 together with the cover 12 could pass non-braked. This is why special attention has to be paid to a connection between the drive mechanism 28 and the coupling piece 26. As an additional safeguard, the braking element 22 may exert a lateral force on the drive mechanism 28, e.g. through a cantilever or the coupling piece 26, so that the drive mechanism 28 will get jammed in the cable guide 30 during an accident (FIG. 4). To this end, the elongated hole 24 or the vertical protrusions 34, as seen in a top view, could have the contour of a wedge that tapers in an outward direction, while the entraining portion 32 likewise would be realized as a triangular wedge as seen in the top view. During relative movement, the braking element 22 on the one hand would bulge out in upward and downward directions due to the displacement of the entraining portion 32, and on the other hand the entraining portion 32 would be urged due to the wedge towards the cable guide 30 in order to lock the cable therein.

It would likewise be possible to couple the entraining portion 32 to the braking element 22 with a guide slot, so that a lateral displacement of the braking element 22 relative to the coupling piece 26 occurs in addition to the process of locking the braking element 22 in the right-hand guide 19. This lateral displacement may result in the braking element 22 locking the drive mechanism 28 in the cable guide 30, e.g. through a protrusion extending into the cable guide 30, or the entraining portion 32 being urged along with a remainder of the coupling piece 26 towards the cable guide 30, in order to wedge or lock the drive mechanism 28 in the cable guide 30.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A safety braking device of a sliding roof cover that can be moved in translation along vehicle-fixed guides, comprising:
   at least one braking element coupled with a sliding roof cover, and to be moved together with the sliding roof cover in translation along an associated guide in normal operation; and
   a coupling piece movable with the sliding roof cover and connecting the sliding roof cover and the at least one braking element, the coupling piece extending into the at least one braking element, and the coupling piece displacing in the at least one braking element in response to an abrupt acceleration of the sliding roof cover relative to the associated guide and deforming the at least one braking element such that the at least one braking element and the associated guide get jammed to prohibit movement of the sliding roof cover along the associated guide.

2. The safety braking device according to claim 1, wherein the coupling piece is directly attached to a drive mechanism of the sliding roof cover.

3. The safety braking device according to claim 2, wherein the at least one braking element locks the drive mechanism in a guide for the drive mechanism when the safety braking device is actuated.

4. The safety braking device according to claim 1, wherein the at least one braking element is a sliding carriage that governs movement of the sliding roof cover.

5. The safety braking device according to claim 1, wherein the at least one braking element transmits raising forces to the sliding roof cover.

6. The safety braking device according to claim 1, wherein the coupling piece has an entraining portion that laterally extends into the at least one braking element.

7. The safety braking device according to claim 6, wherein the entraining portion is elongate in a horizontal direction and extends into the at least one braking element.

8. The safety braking device according to claim 6, wherein the at least one braking element includes at least one protrusion located in a vehicle longitudinal direction in at least one of a position in front of and behind the entraining portion of the coupling piece, the at least one protrusion extending into a horizontal travel path of the entraining portion.

9. The safety braking device according to claim 8, wherein the at least one protrusion comprises at least two opposite protrusions located in the at least one of a position in front of and behind the entraining portion.

10. The safety braking device according to claim 8, wherein the at least one protrusion directly adjoins the entraining portion and makes contact with the entraining portion when the safety braking device is not activated.

11. The safety braking device according to claim 8, including a recess in the at least one braking element, the recess comprising an elongated hole that is constricted by the at least one protrusion in front of at least one of opposing axial ends of the elongated hole in a direction of travel and spaced therefrom.

12. The safety braking device according to claim 11, wherein a height of the recess in the at least one braking element is equal to an overall height of the entraining portion of the coupling piece extending into the recess.

13. The safety braking device according to claim 1, wherein the at least one braking element has a braking rib at an outer side facing the associated guide.

14. The safety braking device according to claim 13, wherein the braking rib is situated in a region of a protrusion on the at least one braking element.

15. The safety braking device according to claim 1, wherein the at least one braking element is made of plastic.

* * * * *